(12) United States Patent
Hao et al.

(10) Patent No.: US 7,628,845 B2
(45) Date of Patent: Dec. 8, 2009

(54) FILTERING DEVICE AND FILTERING METHOD THEREOF AND SEMICONDUCTOR FABRICATING METHOD

(75) Inventors: Hung-Hu Hao, Hsin-chu (TW); Kuo-Pang Tseng, Hsin-chu (TW)

(73) Assignee: Macronix International Co., Ltd., Hsinchu (TW)

( * ) Notice: Subject to any disclaimer, the term of this patent is extended or adjusted under 35 U.S.C. 154(b) by 550 days.

(21) Appl. No.: 11/372,193

(22) Filed: Mar. 10, 2006

(65) Prior Publication Data

US 2007/0209515 A1    Sep. 13, 2007

(51) Int. Cl.
    *B01D 53/02*    (2006.01)
(52) U.S. Cl. .............................. 96/126; 96/108; 96/121
(58) Field of Classification Search ............... 96/108, 96/109–154; 95/90–148
    See application file for complete search history.

(56) References Cited

U.S. PATENT DOCUMENTS

| | | | |
|---|---|---|---|
| 6,352,578 B1 * | 3/2002 | Sakata et al. ................... 96/134 |
| 6,491,884 B1 * | 12/2002 | Faller et al. .................. 423/210 |
| 6,517,592 B2 * | 2/2003 | Umotoy et al. ............. 55/315.2 |
| 6,527,828 B2 * | 3/2003 | Flippo et al. .................... 95/54 |
| 6,551,381 B2 * | 4/2003 | Flippo et al. .................... 95/54 |
| 7,008,471 B2 * | 3/2006 | Koyama et al. ............... 96/131 |
| 7,014,682 B2 * | 3/2006 | Hickerson et al. .............. 95/92 |
| 7,314,506 B2 * | 1/2008 | Vininski et al. ............... 95/114 |
| 2001/0004879 A1 * | 6/2001 | Umotoy et al. ............... 118/715 |
| 2001/0029841 A1 * | 10/2001 | Li et al. .......................... 95/45 |
| 2002/0178923 A1 * | 12/2002 | Kishovich et al. ............. 96/135 |
| 2003/0047070 A1 * | 3/2003 | Flippo et al. .................... 95/92 |
| 2004/0069144 A1 * | 4/2004 | Wegeng et al. ................ 95/106 |
| 2004/0083894 A1 * | 5/2004 | Koyama et al. ............... 96/133 |
| 2004/0265199 A1 * | 12/2004 | MacKnight ................. 423/220 |
| 2005/0028672 A1 * | 2/2005 | Hickerson et al. .............. 95/90 |
| 2005/0109207 A1 * | 5/2005 | Olander et al. ................ 95/141 |
| 2006/0086247 A1 * | 4/2006 | Vininski et al. ............... 95/115 |
| 2006/0169139 A1 * | 8/2006 | Kishkovich et al. ............ 95/90 |
| 2007/0151452 A1 * | 7/2007 | Giacobbe ..................... 95/143 |
| 2007/0204638 A1 * | 9/2007 | Kim et al. .................. 62/238.3 |

FOREIGN PATENT DOCUMENTS

CN           2841646 Y        11/2006

* cited by examiner

*Primary Examiner*—Duane Smith
*Assistant Examiner*—Christopher P Jones
(74) *Attorney, Agent, or Firm*—Birch, Stewart, Kolasch & Birch, LLP (57) ABSTRACT

A filtering device and a filtering method and a semiconductor fabricating method thereof. The filtering device is used for filtering a gas had a first temperature. The filtering device includes a casing, a cooling mechanism and at least one adsorbing element. The casing has an input opening, an output opening and a cooling space. The gas enters the cooling space through the input opening and leaves the cooling space through the output opening. The cooling mechanism coupled to the casing is used for maintaining the cooling space at a second temperature that is lower than the first temperature. At least one adsorbing element is disposed inside the cooling space and has a plurality of surface-increasing elements arranged in a direction parallel. The plurality of surface-increasing elements arranged in the direction parallel to that the gas flows inside the cooling space for contacting the gas and adsorbing particles in the gas.

4 Claims, 7 Drawing Sheets

FIG. 7

FILTERING DEVICE AND FILTERING METHOD THEREOF AND SEMICONDUCTOR FABRICATING METHOD

BACKGROUND OF THE INVENTION

1. Field of the Invention

The invention relates in general to a filtering device and a filtering method and a semiconductor fabricating method thereof, and more particularly to a filtering device with an adsorbing element having a plurality of surface-increasing elements arranged in a direction parallel and a filtering method and a semiconductor fabricating method thereof.

2. Description of the Related Art

During the semi-conductor manufacturing process, the wafer must go through several steps of manufacturing processes to complete various micro-electronic elements and the layout of circuits. No matter the manufacturing process is deposition process, oxidation process, diffusion process or etching process, it is possible that exhaust gas mixed with particles is generated in the semi-conductor machine.

The semi-conductor machine has a reaction chamber and an exhaust pipe. The thin-film deposition process of the wafer is processed at a reaction chamber, and the exhaust gas generated during the manufacturing process is extracted from reaction chamber through the exhaust pipe. Especially, for those low-pressure deposition processes, such as plasma enhanced chemical vapor deposition (PECVD) or low pressure chemical vapor deposition (LPCVD), the exhaust gas must be extracted from the reaction chamber through the exhaust pipe by a pump. The pump, when started, can extract the gas from the reaction chamber through the exhaust pipe so that the reaction chamber is void of exhaust gas, or maintain the reaction chamber at a low-pressure or a vacuum state.

The gas in the reaction chamber is normally mixed with particles such as silicon nitride. The particles can be attached to the inner-wall of the exhaust pipe, affecting extraction, or enter the pump, resulting in overload. Therefore, a cold trap is needed to filter the gas.

A conventional cold trap is used for filtering particles in the gas. The temperature of the gas is higher than the temperature of the cold trap. The conventional cold trap includes a cooling space and a cylindrical cooling element. With the extraction of the gas by the pump, the gas can enter the cooling space through the exhaust pipe at one end of the cooling space and leave the cooling space from another end of the cooling space to enter the pump. The cylindrical cooling element is disposed within the cooling space, and the temperature of the cylindrical cooling element is lower than the temperature of the gas entering the cooling space. When the gas contacts the surface of the cylindrical cooling element in the cooling space, the temperature of the gas plummets. Therefore, part of the particles will be absorbed to the surface of the cylindrical cooling element. By doing so, the cold trap can filter particles in the gas, lest the particles be attached to the inner-wall of the exhaust pipe or the pump.

However, the surface of the cylindrical cooling element is smooth and has a limited absorptive area, so that the absorption of particles in the gas by the cylindrical cooling element is restricted. The absorptive capacity of the cylindrical cooling element will soon reach a saturation state, and can not continue to absorb particles in the gas. Therefore, the operator needs to halt the operation of the machinery and replace or clean the cylindrical cooling element. Thus, too short a replacement cycle of the cylindrical cooling element not only reduces the productivity of the facility and increase labor costs, but also increases the danger of replacing the cylindrical cooling element.

SUMMARY OF THE INVENTION

It is therefore an object of the invention to provide a filtering device and a filtering method thereof. The design of using an adsorbing element having a plurality of surface-increasing elements arranged in a direction parallel to that the gas flows inside the cooling space for increasing the contact area with the gas effectively absorbs particles in the gas. Therefore, the filtering ability of the filtering device is largely enhanced and the problems that a conventional cold trap having a cylindrical cooling element would encounter are avoided. Thus, the invention not only prolongs the replacement cycle of the adsorbing element and reduces the replacement frequency of the adsorbing element, but also increases the productivity of the facility and reduces the danger of replacing the adsorbing element.

The invention achieves the above-identified object by providing a filtering device. The filtering device is used for filtering a gas. The gas has a first temperature. The filtering device includes a casing, a cooling mechanism and at least one adsorbing element. The casing has an input opening, an output opening and a cooling space. The gas enters the cooling space through the input opening and leaves the cooling space through the output opening. The cooling mechanism coupled to the casing is used for maintaining the cooling space at a second temperature. The second temperature is lower than the first temperature. At least one adsorbing element is disposed inside the cooling space and has a plurality of surface-increasing elements arranged in a direction parallel to that the gas flows inside the cooling space for contacting the gas and adsorbing particles in the gas.

The invention achieves the above-identified object by providing another filtering method for filtering a gas. The gas has a first temperature. Firstly, at least one adsorbing element having a plurality of surface-increasing elements arranged in a direction parallel interlaced with each other is provided. The adsorbing element is maintained at a second temperature lower than the first temperature. The gas is guided to flow through the adsorbing element, so that the plurality of surface-increasing elements arranged in the direction parallel contact the gas and absorb particles in the gas.

The invention achieves the above-identified object by providing another semiconductor fabricating method. Firstly, a wafer is disposed in a chamber. The chamber has a first temperature for processing a semiconductor process. At least one adsorbing element having a plurality of surface-increasing elements arranged in a direction parallel interlaced with each other is provided. The adsorbing element is maintained at a second temperature lower than the first temperature. The gas in the chamber is guided to flow through the adsorbing element, so that a plurality of surface-increasing elements arranged in a direction parallel contact the gas and absorb particles in the gas.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
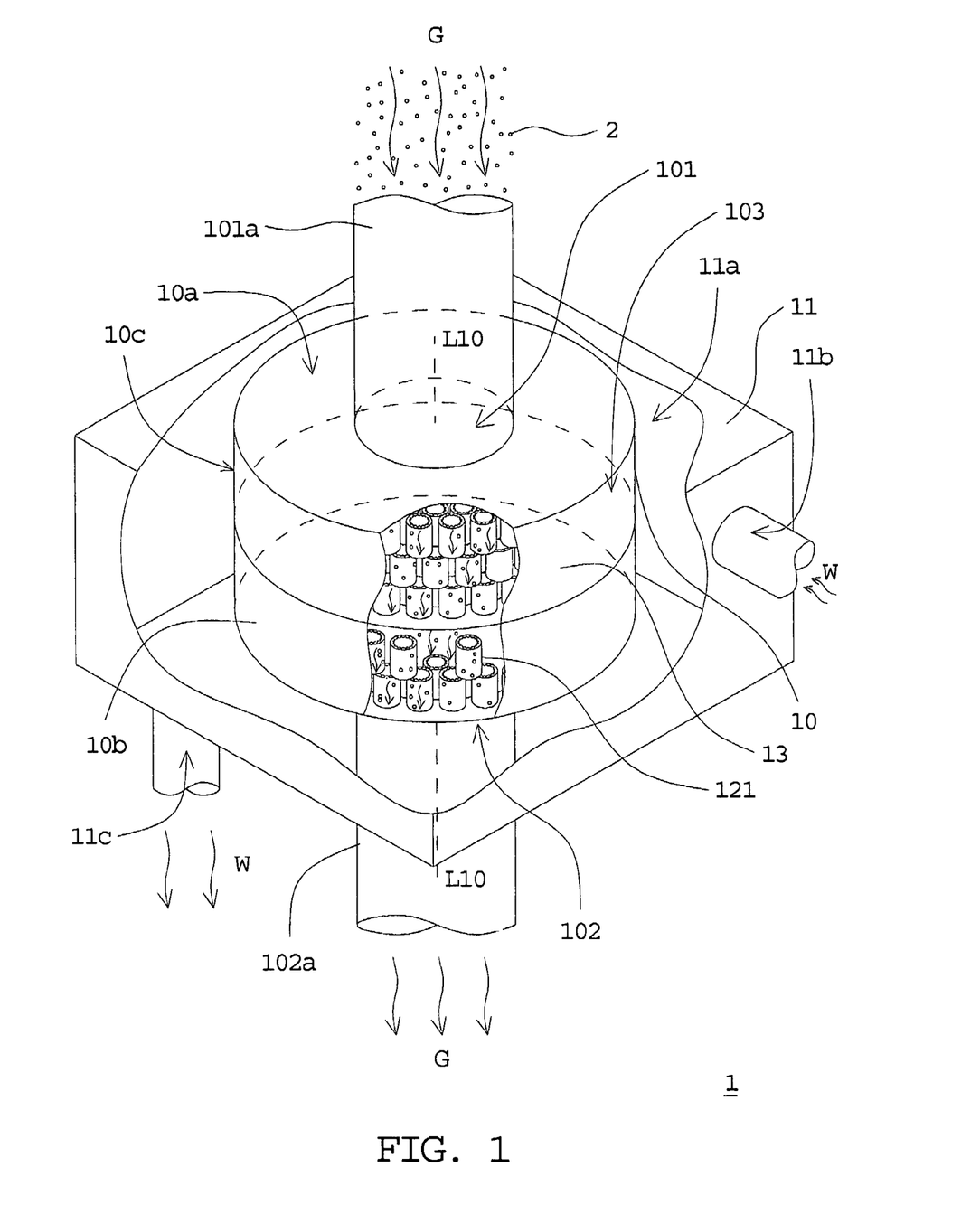
FIG. 1 is a diagram of a filtering device according to a first embodiment of the invention.

Referring to FIG. 1, a diagram of a filtering device according to a first embodiment of the invention is shown. The filtering device 1 includes a casing 10, a cooling mechanism 11 and at least one adsorbing element 121. The filtering device 1 is used for filtering a gas G. The gas G has a first temperature. In the present embodiment, the filtering device 1 is exemplified by several adsorbing elements 121. The casing 10 has an input opening 101, an output opening 102 and a cooling space 103. The gas G having the first temperature enters the cooling space 103 through the input opening 101 and leaves the cooling space 103 through the output opening 102. The cooling mechanism 103 is coupled to the casing 10 for maintaining the cooling space 103 at a second temperature. The second temperature is lower than the first temperature. The adsorbing element 121 is disposed inside the cooling space 103 and has a plurality of surface-increasing elements arranged in a direction parallel. The plurality of surface-increasing elements arranged in the direction parallel are interlaced with each other. The plurality of surface-increasing elements arranged in a direction parallel are used for contacting the gas and absorbing the particles 2 in the gas G, so that the gas G leaving the cooling space 103 is almost free of particles.

In the present embodiment, the design of having the plurality of surface-increasing elements arranged in the direction parallel be interlaced with each other can increase the contact area between the adsorbing element 121 and the gas G, largely increasing the filtering ability of the filtering device 1. The positions of the plurality of surface-increasing elements arranged in the direction parallel of the adsorbing element 121 are explained below. However, the technology of the present embodiment is not limited thereto.

Figure 2A:
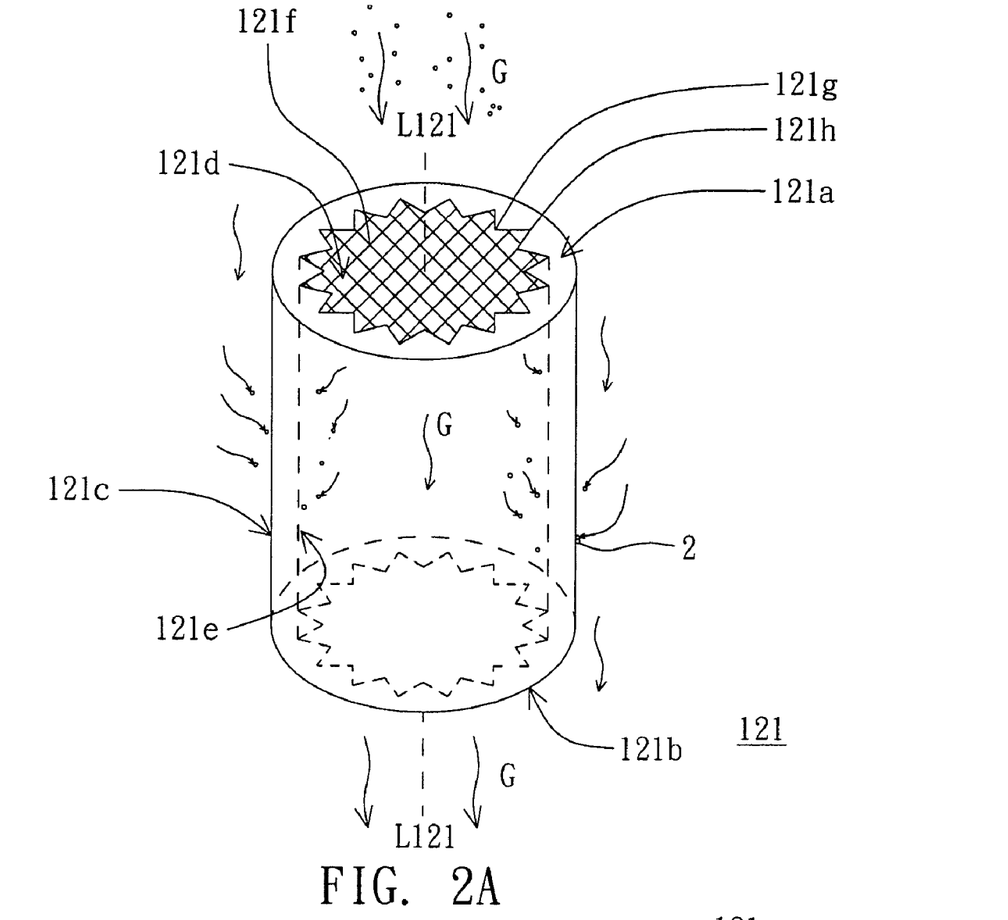
FIG. 2A is a three-dimensional diagram of an adsorbing element according to a first embodiment of the invention.
Figure 2B:
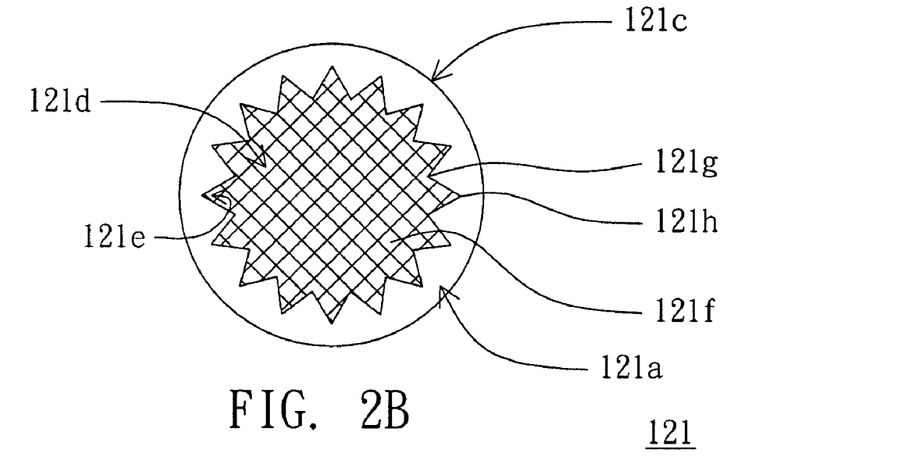
FIG. 2B is a top view of an adsorbing element in FIG. 2A.

Referring to both FIGS. 2A~2B, FIG. 2A is a three-dimensional diagram of an adsorbing element according to a first embodiment of the invention is shown. FIG. 2B is a top view of an adsorbing element in FIG. 2A. The adsorbing element 121 has a top surface 121a, a bottom surface 121b and a via hole 121d. The via hole 121d passes through the top surface 121a and the bottom surface 121b. For example, the adsorbing element 121 is a hollowed cylinder. In the present embodiment, the inner-wall 121e of the via hole 121d has a plurality of surface-increasing elements arranged in a direction parallel. The plurality of surface-increasing elements arranged in the direction parallel comprises several peak parts 121g and gorge parts 121h. As shown in FIG. 2B, viewing from the cross section of the adsorbing element 121, the peak parts virtually look like sharp protrusions, and the gorge parts 121h virtually look like sharp recesses.

Anyone who is skilled in the technology of the invention will understand that the shapes of the cross sections of the peak parts 121g and the gorge parts 121h are not limited to the sharp protrusions and the sharp recesses disclosed in the present embodiment, and that variations of the types of structures are still within the scopes of technology of the present embodiment. For example, viewing from the cross section of the adsorbing element 121, the peak parts 121g and the gorge parts 121h can respectively be semi-circular protrusions and semi-circular recesses.

The metal material has excellent heat conduction, and the peak parts 121g and the gorge parts 121h are easy to be formed using metals at the same time when molding the adsorbing element 121. Therefore, in the present embodiment, the material of the adsorbing element 121 is preferably exemplified by a metal. Despite the adsorbing element 121 is exemplified by a metal, however, the adsorbing element of the present embodiment can adopt appropriate absorptive materials according to the natures of the particles to be filtered. Any design using an adsorbing element having a plurality of surface-increasing elements arranged in a direction parallel to filter particles is within the technology of the present embodiment.

As for how the filtering device 1 is connected to the furnace pipe and the pump is disclosed below. However, the technology of the present embodiment is not limited thereto, As shown in FIG. 1, the input opening 101 is connected to the furnace pipe (not shown in the diagram) through a first pipe 101a, and the output opening 102 is connected to a pump (not shown in the diagram) through a second pipe 102a. When the pump operates, the gas G inside the furnace pipe can be pumped into the cooling space 103 through the first pipe 101a and the input opening 101 in sequence. The gas G can be further extracted from the cooling space 103 through the output opening 102 and the second pipe 102a in sequence.

In the present embodiment, the furnace pipe is for the wafer to proceed with the chemical vapor deposition process of silicon nitride for instance. The gas G inside the furnace pipe contains particles 2 of uncompleted silicon nitride. Such particles 2 have the following characteristics: When the gas G is at the first temperature, such as 200° C. for instance, the particles 2 in the gas G are in a suspension state. When the gas G is at the second temperature, such as 10° C. for instance, the particles 2 in the gas G are in a retardation state. When the gas G carrying the particles 2 flow through the adsorbing element 121 and contact the side surface 121c or the peak parts 121g and the gorge parts 121h on the inner-wall 121e, the temperature of the particles 2 plummets to the second temperature from the first temperature in a instant, so that the particles 2 stay on the side surface 121c of the adsorbing element 121 or the peak parts 121g and the gorge parts 121h on the inner-wall 121e. Owing to the several peak parts 121g and gorge parts 121h, the adsorbing element 121 has a larger contact area than a conventional cylindrical cooling element. Therefore, during the short process when the gas G flows through the adsorbing element 121, the particles 2 are effectively absorbed and attached to the adsorbing element 121.

As shown in FIG. 1, the casing 10 further has a top surface 10a, a bottom surface 10b and a side surface 10c. The top surface 10a is connected to the bottom surface 10b via the side surface 10c. In order to maintain the flowing speed of the gas G, the input opening 101 is preferably disposed on the top surface 10a, and the output opening 102 is corresponding to the input opening 101 and disposed on the bottom surface 10b. Furthermore, the adsorbing element 121 is substantially arranged along the flowing direction of the gas G. That is, the central spindle L121 (as shown in FIG. 2A) of the adsorbing element 121 is parallel to the connecting extension line L10 of the input opening 101 and the output opening 102. The gas G can pass through the via hole 121d or flow through the side surface 121c of the adsorbing element 121.

The input opening 101 and the output opening 102 of the present embodiment can also be disposed on various positions of the casing 10. For example, the input opening is disposed on the side surface 10c of the casing 10 but close to the top surface 10a, and the output opening is disposed on the bottom surface 10b. Or, the input opening is disposed on the top surface 10a, and the output opening is disposed on the side surface 10c but close to the bottom surface 10b. Or, the input opening and the output opening 102 are disposed on the side surface 10b of the casing 10, but the input opening and the output opening 102 are respectively disposed close to the top surface 10a and the bottom surface 10b. Anyone who is skilled in the technology of the present embodiment will understand that various modifications and similar arrangements and procedures of the present embodiment are still within the scope of protection of the invention.

As shown in FIG. 2A~2B, the filtering device 1 preferably further includes a filter screen 121f. The filter screen 121f is disposed at one end of the via hole 121d and seals the via hole 121d at one end of the opening. When the gas G passes through the via hole 121d, the filter screen 121f can filter part of the particles 2.

As shown in FIG. 1, the filtering device 1 preferably further includes a mesh spacer 13 used for dividing the cooling space 103 into two spaces, such as an upper space and a lower space. More adsorbing elements 121 are disposed on the upper space close to the input opening 101, and fewer adsorbing elements 121 are disposed on the lower space close to the output opening 102. By doing so, most of the particles 2 are absorbed by the adsorbing element 121 once the gas G enters the cooling space 103, further increasing the filtering efficiency and the effect of the adsorbing element 121.

Moreover, the cooling mechanism 11 can maintain the temperature of the cooling space 103 in various manners. In the present embodiment, the cooling mechanism 11 includes a cooling chamber 11a and a cooling liquid W having the second temperature. The cooling chamber 11a has a filling opening 11b and a discharge opening 11c. The cooling space 103 is disposed inside the cooling chamber 11a. The cooling liquid W enters the cooling chamber 11a through the filling opening 11b and leaves the cooling chamber 11a through the discharge opening 11c. When flowing through the casing 10 of the cooling space 103, the cooling liquid W having the second temperature carries the heat of the cooling space 103 away, so that the cooling space 103 maintains at the second temperature. That is, the adsorbing element 121 is maintained at the second temperature lower than the first temperature of the gas G. When the cooling liquid W passes through the cooling chamber 11a, the cooling liquid W is isolated from and does not come into contact with the gas G, lest the flow of the gas G might be interfered with.

The filtering device disclosed in the present embodiment, which uses an adsorbing element having a plurality of surface-increasing elements arranged in a direction parallel to increase the contact area with the gas, effectively absorbs particles in the gas. Therefore, the filtering ability of the filtering device is largely enhanced and the problems that a conventional cold trap having a cylindrical cooling element would encounter are avoided. Thus, the present embodiment not only prolongs the replacement cycle of the adsorbing element and reduces the replacement frequency of the adsorbing element, but also increases the productivity of the facility and reduces the danger of replacing the adsorbing element.

Second Embodiment

Figure 3A:
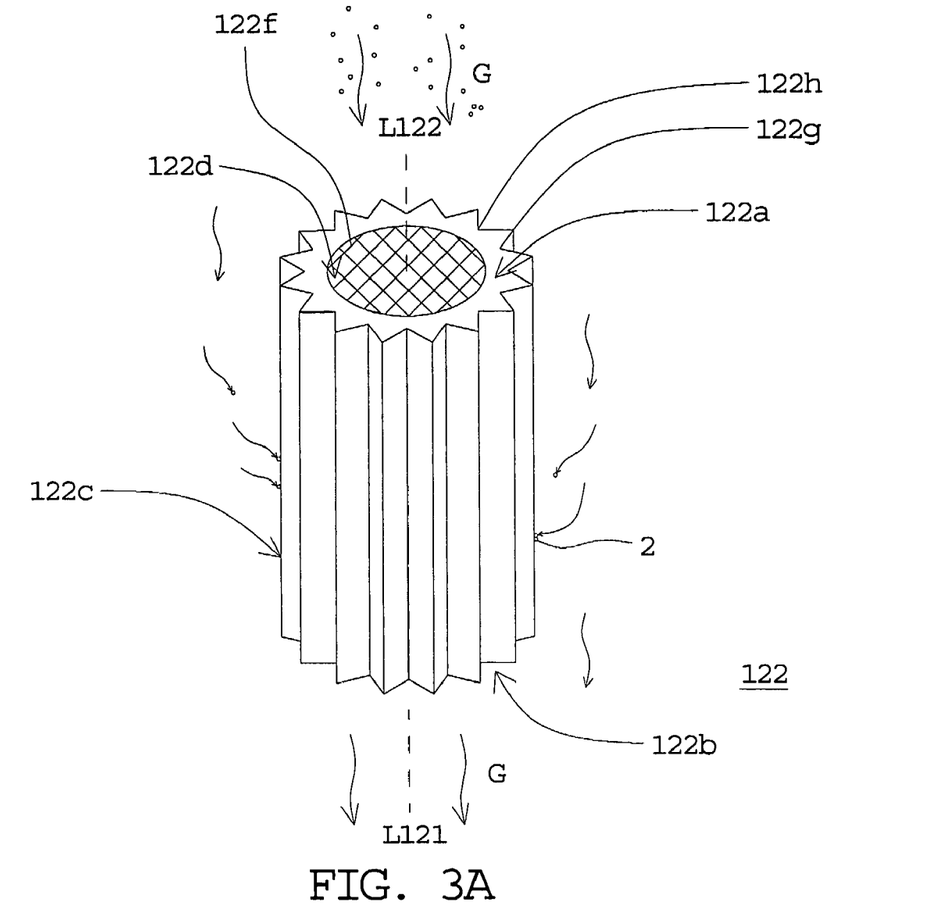
FIG. 3A is a three-dimensional diagram of an adsorbing element according to a second embodiment of the invention.
Figure 3B:
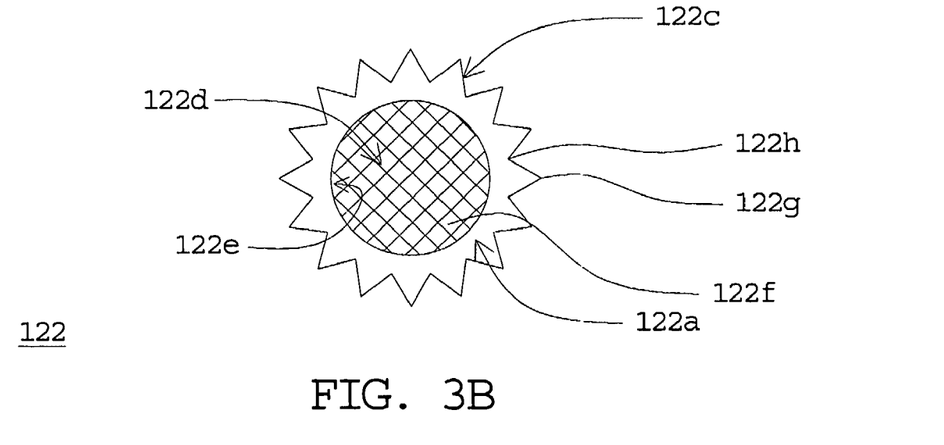
FIG. 3B is a top view of an adsorbing element in FIG. 3A.

Referring to both FIGS. 3A~3B, FIG. 3A is a three-dimensional diagram of an adsorbing element according to a second embodiment of the invention, and FIG. 3B is a top view of an adsorbing element in FIG. 3A. The adsorbing element 122 of the present embodiment differs with the adsorbing element 121 of the first embodiment in the structural design of the adsorbing element 122 and the positions of the plurality of surface-increasing elements arranged in the direction parallel. Moreover, the adsorbing element 122 of the present embodiment can also be disposed inside the cooling space 103 of the filtering device 1 of the first embodiment. As for the same elements, the same labels are used and are not repeated here.

As shown in FIG. 3A~3B, the adsorbing element 122 further has a bottom surface 122b, a top surface 122a, a side surface 122c and a via hole 122d. The side surface 122c connects the bottom surface 122b and the top surface 122a. The via hole 122d passes through the bottom surface 122b and the top surface 122a. For example, the adsorbing element 122 is a hollowed cylinder. In the present embodiment, the side surface 122c has the plurality of surface-increasing elements arranged in the direction parallel. The plurality of surface-increasing elements arranged in the direction parallel comprises several peak parts 122g and gorge parts 122h. As shown in FIG. 3B, viewing from the cross section of the adsorbing element 122, the peak parts 122g virtually look like sharp protrusions, and the gorge parts 122h virtually look like sharp recesses.

The peak parts 122g and the gorge parts 122h are interlaced with each other and are used for contacting the gas and absorbing the particles 2 in the gas G, so that the gas G leaving the cooling space is almost free of particles.

Anyone who is skilled in the technology of the invention will understand that the shapes of the cross sections of the peak parts 122g and the gorge parts 122h are not limited to the sharp protrusions and the sharp recesses disclosed in the present embodiment, and that variations of the types of structures are still within the scopes of technology of the present embodiment. For example, viewing from the cross section of the adsorbing element 122, the peak parts 122g and the gorge parts 122h can respectively be semi-circular protrusions and semi-circular recesses.

Anyone who is skilled in the technology of the invention will understand that the adsorbing element 123 of the present embodiment is not limited to a hollowed cylinder having a via hole and that variations of the types of structures are still within the scopes of technology of the present embodiment. For example, the adsorbing element can be a solid cylinder.

Third Embodiment

Figure 4A:
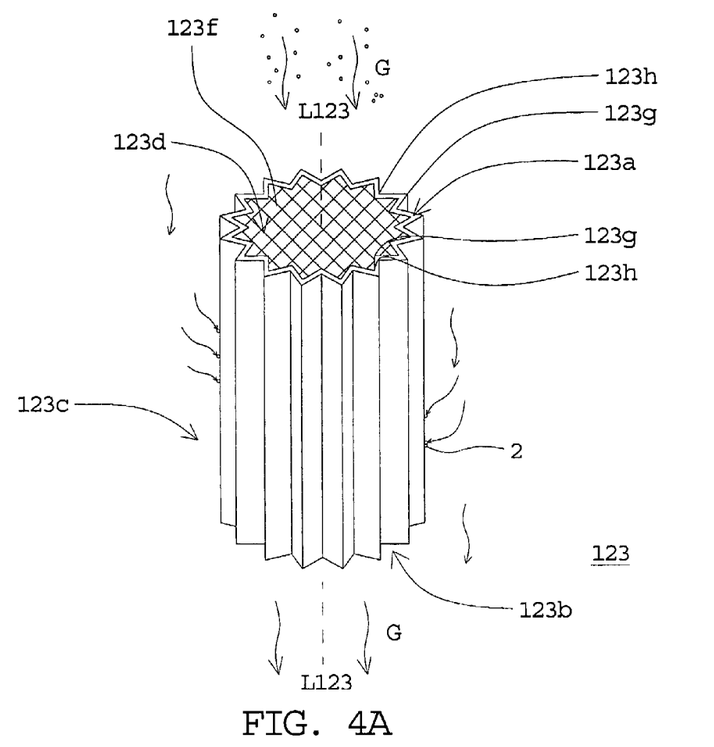
FIG. 4A is a three-dimensional diagram of an adsorbing element according to a third embodiment of the invention.
Figure 4B:
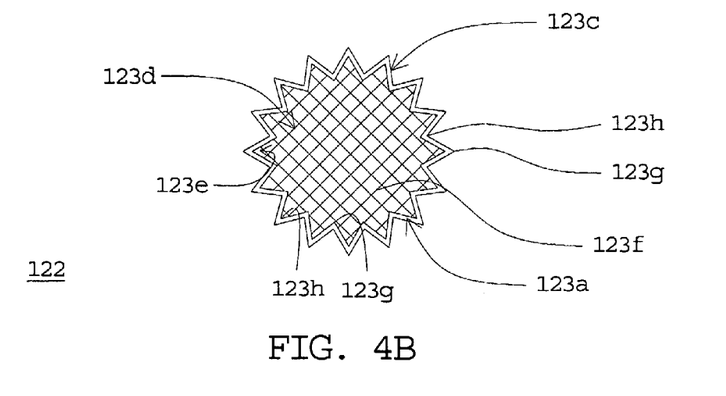
FIG. 4B is a top view of an adsorbing element in FIG. 4A.

Referring to both FIGS. 4A~4B, FIG. 4A is a three-dimensional diagram of an adsorbing element according to a third embodiment of the invention, and FIG. 4B is a top view of an adsorbing element in FIG. 4A. The adsorbing element 123 of the present embodiment differs with the adsorbing element 121 of the first embodiment in the structural design of the adsorbing element 123 and the positions of the plurality of surface-increasing elements arranged in the direction. Furthermore, the adsorbing element 123 of the present embodiment can also be disposed inside the cooling space 103 of the filtering device 1 of the first embodiment. As for the same elements, the same labels are used and are not repeated here.

As shown in FIGS. 4A~4B, the adsorbing element 123 further has a bottom surface 123b, a top surface 123a, a side surface 123c and a via hole 123d. The side surface 123c connects the bottom surface 123b and the top surface 123a. The via hole 123d passes through the bottom surface 123b and the top surface 123a. For example, the adsorbing element 123 is a hollowed cylinder. In the present embodiment, the inner-wall 123e of the via hole 123d and the side surface 123c of the adsorbing element 123 have the plurality of surface-increasing elements arranged in the direction parallel. The plurality of surface-increasing elements arranged in the direction parallel comprises several peak parts 123g and gorge parts 123h. As shown in FIG. 4B, viewing from the cross section of the adsorbing element 123, the peak parts 123g virtually look like sharp protrusions, and the gorge parts 123h virtually look like sharp recesses.

The peak parts 123g and the gorge parts 123h are interlaced with each other and are used for contacting the gas and absorbing the particles 2 in the gas G, so that the gas G leaving the cooling space is almost free of particles.

Anyone who is skilled in the technology of the invention will understand that the cross-sectional shapes of the peak parts 123g and the gorge parts 123h are not limited to the sharp protrusions and the sharp recesses disclosed in the present embodiment, and that variations of the types of structures are still within the scopes of technology of the present embodiment. For example, viewing from the cross section of the adsorbing element 123, the peak parts 123g and the gorge parts 123h can respectively be semi-circular protrusions and semi-circular recesses.

According to the above three embodiments, the peak parts and the gorge parts of the invention can be formed in various manners. For example, the peak parts and the gorge parts can be formed via compressing or molding, or by bending along several bending lines of a side plate. Various manners of forming the plurality of surface-increasing elements arranged in the direction parallel various are still within the scopes of protection of the invention.

Fourth Embodiment

Figure 5:
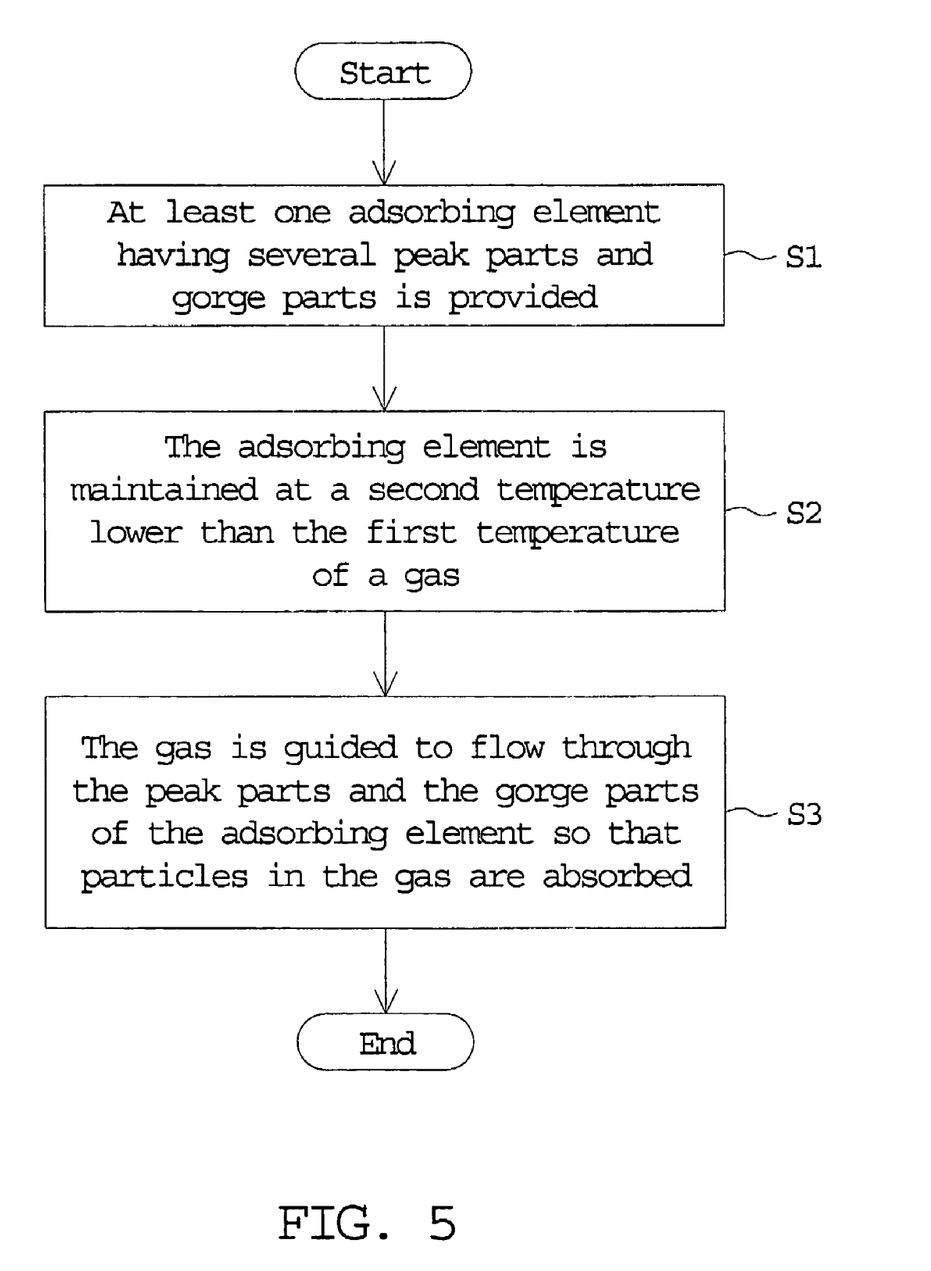
FIG. 5 is a flowchart of a filtering method according to the invention.

Referring to FIG. 5, a flowchart of a filtering method according to the invention is shown. Firstly, the method begins at step S1, at least one adsorbing element is provided. The adsorbing element, which can be the adsorbing element disclosed in above embodiments, is exemplified by the adsorbing element 123 of the third embodiment here. The adsorbing element 123 the plurality of surface-increasing elements arranged in the direction parallel. the plurality of surface-increasing elements arranged in the direction parallel comprises several peak parts 123g and gorge parts 123h. The peak parts 123g and the gorge parts 123h are interlaced with each other (as shown in FIG. 4B).

Next, proceed to step S2, the adsorbing element 123 is maintained at a second temperature lower than the first temperature.

Then, proceed to step S3, the gas G having a first temperature is guided to flow through the adsorbing element 123, so that the peak parts 123g and the gorge parts 123h contact the gas G and absorb particles 2 in the gas G.

In the step (S2) of maintaining the temperature of the adsorbing element 123, a cooling liquid W (as shown in FIG. 1) is used to maintain the adsorbing element 123 at a second temperature. Moreover, preferably the gas G, which can be further guided to flow through the filter screen 123f (as shown in FIG. 4A), is used for filtering part of the particles 2. The gas G is guided to flow through the adsorbing element 123 by extraction.

Fifth Embodiment

Figure 6:
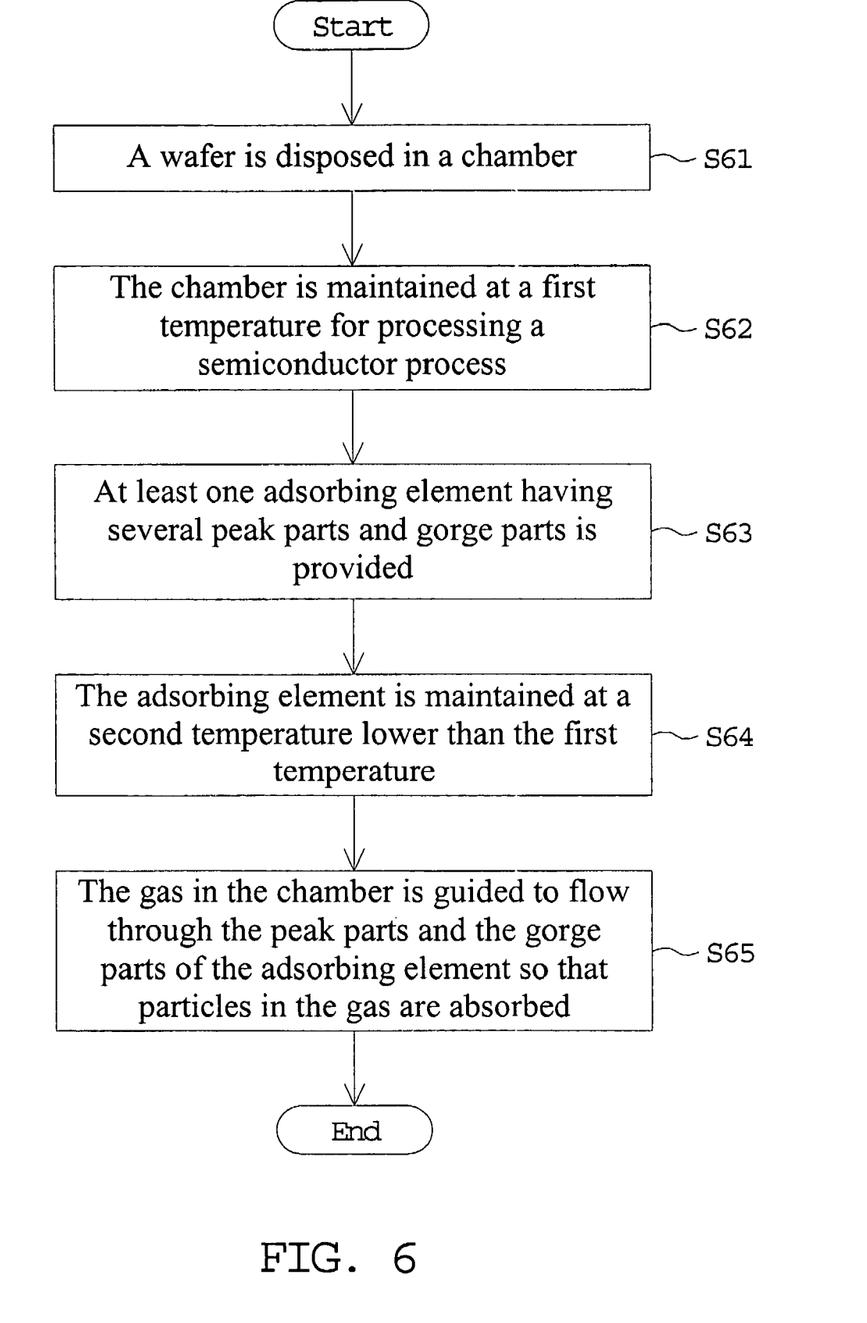
FIG. 6 is a flowchart of a semiconductor fabricating method according to the fifth embodiment of the invention.

Referring to FIG. 6, a flowchart of a semiconductor fabricating method according to the invention is shown. The semiconductor fabricating method of the present embodiment adopts the filtering device 1 and the adsorbing element 121 of the first embodiment. As for the same elements, the same labels are used and are not repeated here.

Figure 7:
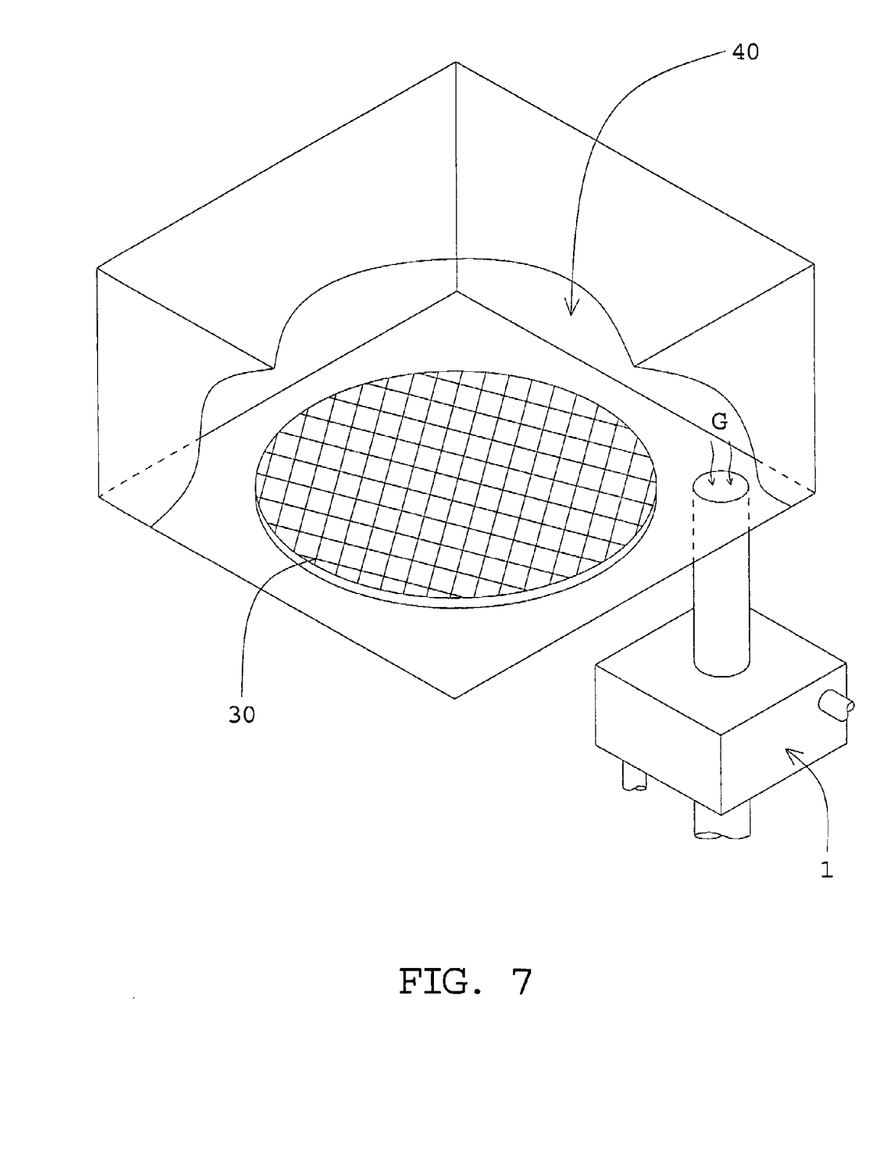
FIG. 7 is a diagram of a wafer and a chamber.

Referring to FIG. 7, a diagram of a wafer and a chamber is shown. Firstly, the method begins at step S61 in the FIG. 6, a wafer is disposed in a chamber.

Then, proceed to step S62 in the FIG. 6, the chamber has a first temperature, for processing a semiconductor process of the wafer 30.

Referring to FIG. 1 and FIG. 2A~2B. Next, proceed to step S63 in the FIG. 6, at least one adsorbing element is provided. The adsorbing element, which can be the adsorbing element disclosed in above embodiments, is exemplified by the adsorbing element 121 of the third embodiment here. The adsorbing element 121 has a plurality of surface-increasing elements arranged in a direction parallel. The plurality of surface-increasing elements arranged in the direction parallel comprises several peak parts 121g and gorge parts 121h. The peak parts 121g and the gorge parts 121h are interlaced with each other (as shown in FIG. 4B).

Next, proceed to step S64 in the FIG. 6, the adsorbing element 121 is maintained at a second temperature lower than the first temperature.

Then, proceed to step S65 in the FIG. 6, the gas G in the chamber 40 is guided to flow through the adsorbing element 121, so that the peak parts 121g and the gorge parts 121h contact the gas G and absorb particles 2 in the gas G, as shown in FIG. 2B.

The filtering device and a filtering method and a semiconductor fabricating method thereof disclosed in above embodiments of the invention, which use an adsorbing element having a plurality of surface-increasing elements arranged in a direction parallel to increase the contact area with the gas, effectively absorb particles in the gas. Therefore, the filtering ability of the filtering device is largely enhanced and the problems that a conventional cold trap having a cylindrical cooling element would encounter are avoided. Thus, the present embodiment not only prolongs the replacement cycle of the adsorbing element and reduces the replacement frequency of the adsorbing element, but also increases the productivity of the facility and reduces the danger of replacing the adsorbing element.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A filtering device used for filtering a gas, wherein the gas has a first temperature, the filtering device comprises:
   a casing having an input opening, an output opening and a cooling space, wherein the gas enters the cooling space through the input opening and leaves the cooling space through the output opening;

a cooling mechanism coupled to the casing for maintaining the temperature inside the cooling space at a second temperature, which is lower than the first temperature; and a plurality of adsorbing elements disposed inside the cooling space and including a plurality of surface-increasing elements arranged in a direction parallel to the direction that the gas flows inside the cooling space for absorbing particles in the gas by cooling down the particles which are contacted by a plurality of walls of the adsorbing elements;

wherein each of the adsorbing elements has a bottom surface, a top surface and a via hole, the via hole passes through the bottom surface and the top surface, and all of the plurality of surface-increasing elements are arranged on a lateral surface of the via hole.

2. The filtering device according to claim 1, further comprising:
a filter screen disposed on the top surface and sealing the via hole for filtering the gas.

3. The filtering device according to claim 1, wherein any cross section of each of the adsorbing element perpendicular to the run-through center line is a hollowed and star-shaped cross section.

4. The filtering device according to claim 1, wherein each of the adsorbing elements is made of a metal.

* * * * *

UNITED STATES PATENT AND TRADEMARK OFFICE
CERTIFICATE OF CORRECTION

PATENT NO. : 7,628,845 B2 Page 1 of 1
APPLICATION NO. : 11/372193
DATED : December 8, 2009
INVENTOR(S) : Hao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this

Second Day of November, 2010

David J. Kappos
*Director of the United States Patent and Trademark Office*